United States Patent [19]

Power et al.

[11] 4,118,541

[45] Oct. 3, 1978

[54] RELEASE SHEET OF A COATED CELLULOSE PAPER

[75] Inventors: George Edward Power; Donald Louis Bolling, both of Cincinnati, Ohio

[73] Assignee: Formica Corporation, Cincinnati, Ohio

[21] Appl. No.: 738,505

[22] Filed: Nov. 3, 1976

[51] Int. Cl.² ............................................. B32B 9/06
[52] U.S. Cl. ................................. 428/452; 428/352; 428/454; 428/481; 428/482; 428/483; 428/487; 428/503; 428/511; 428/515; 427/411; 260/22 CB; 260/856; 260/21
[58] Field of Search ................. 428/352, 343, 40, 511, 428/515, 411, 483, 503, 481, 482, 454, 487, 452; 427/411; 260/22 CB, 21

[56] References Cited

U.S. PATENT DOCUMENTS

| | | | |
|---|---|---|---|
| 2,580,289 | 12/1951 | Fantl | 260/22 CB |
| 3,422,076 | 1/1969 | Petropoulos et al. | 526/15 X |
| 3,442,698 | 5/1969 | Dill et al. | 428/511 X |
| 3,481,891 | 12/1969 | Boylan et al. | 428/481 X |
| 3,770,687 | 11/1973 | Mestesky | 260/30.8 R X |
| 3,946,135 | 3/1976 | Peterson | 428/411 |

*Primary Examiner*—P. C. Ives
*Attorney, Agent, or Firm*—Frank M. Van Riet

[57] ABSTRACT

A release sheet useful in the production of heat and pressure consolidated laminates comprising a paper sheet having coated thereon a first coating comprising
(A) an oil-modified alkyd resin crosslinked with a polyalkylether of a polymethylol melamine and a second coating, atop said (A), comprising
(B) a copolymer of an unsaturated acid, ester or anhydride and a vinyl ether or an unsaturated alkyl compound.

13 Claims, No Drawings

RELEASE SHEET OF A COATED CELLULOSE PAPER

CROSS-REFERENCE TO RELATED APPLICATIONS

This application is related to copending application, Ser. No. 738,213, filed of even date herewith and entitled RELEASE SHEET.

BACKGROUND OF THE INVENTION

Presently known art in the manufacture of textured high pressure decorative laminates is as follows:

An assembly consisting of the following is placed in a flat-bed hydraulic press, whereupon heat and pressure are applied:

Iron
Paper cushion
Stainless steel plate
Laminated aluminum-paper caul stock
Overlay sheet
Decor sheet
Layers of phenolic-kraft core stock
Separator sheet (center line)

The asembly is symmetrical about the center line, therefore, only the upper half is shown. For a complete description of high pressure laminating, see Encyclopedia of Polymer Science and Technology, John Wiley and Sons, Vol 8, pps. 121-163 (1968).

The aluminum-paper caul stock now used, consists of alloy No. 1100 usually in fully annealed state (—0 temper), but also frequently in a harder state such as H-18 or H-19 (full hard). The aluminum foil portion may have a matte finish, a polished finish or a mill finish on its exposed face. The aluminum is bonded to a paper of about 40 lbs./ream by means of casein adhesives. This operation is performed by the caul stock supplier. (See I. O. Robertson, Jr. "Use of Aluminum Foil Release Sheet in Decorative Laminates," TAPPI, Vol. 55, pps. 1341-4, September, 1972.)

When fully annealed alloy No. 1100 in a thickness of 0.0005 inches is laminated matte side out to a 40 lb./ream machine glazed natural kraft paper, it is often called "No. 6 Caul Stock." When used in the above assembly, it will produce a high pressure laminate with an arithmetic average (AA) roughness of about 90 ± 20 microinches. See "Surface Texture" (ASA B46.1-1962) American Society of Mechanical Engineers, New York, 17, N.Y. Its gloss will be 5°-10° measured on a Gardner 60° glossmeter and will depend upon the particular specimen of caul stock chosen. Most rolls will produce laminates of about 6°-8° gloss, but others will produce values up to 10° or higher.

Because of this variation in gloss, it is customary to finish these laminates by the process of "dull rubbing." In this process the laminate is passed through a machine in which its decorative surface is contacted by a number of rotating, cylindrical, nylon fiber brushes. The brushes are flooded with a slurry of pumice and water which abrades the laminate surface and reduces its gloss by about 1°-5° depending upon the force which is used to bring the brush into contact with its surface. Typically, a laminate emerging from the press with a gloss of 6.5 would be dull rubbed with light contact pressure and abraded to a gloss of about 5.5. A laminate having a gloss of 10, however, would require a substantially higher force to bring the brush into very firm contact with the laminate. Even then the reduction in gloss might be only about 3°, say to about 7°.

If the aluminum foil caul stock were more uniform, it would produce laminates having glosses within the range of 6 ± 2, which is commercially desirable. The dull rubbing could then be eliminated which would reduce the cost of manufacture. Additionally, the micro-scratches imparted to the laminate surface during dull rubbing render it less resistant to staining (see Standards Publication LD1-1971, Laminated Thermosetting Decorative Sheets, National Electrical Manufacturers Association, New York, N.Y. 10017 (1971) for method of test). This is due to the fact that thousands of microcracks are introduced into the surface into which very small particles of staining or soiling materials may enter and lodge tenaciously.

Laminates made with the use of No. 6 Caul Stock have a distinctive texture which is often referred to as a "suede" finish, more by custom than any resemblance to a true suede leather.

The suede texture has proven to be of special importance because it is attractive to the touch, yet serves to overcome "telegraphing" of joints, glue lines, coarse grain and other discontinuities which may occur in modern furniture structures, especially those which use frame construction as opposed to solid panels, e.g., in a table top. "Telegraphing" is used in the industry to designate the ability of a plastic sheet to reproduce in its upper surface whatever texture may be possessed by the substrate upon which it rests. Thus, for many years, the best practice in mounting high pressure laminates was to use hardwood faced plywood, usually birch or maple. With the advent of reconstructed wood particleboard for laminate substrates, it became the practice to use three layer construction which featured a layer of "fines" on the bondable surfaces to eliminate "telegraphing."

Furniture manufacturers learned that the suede surface is only mildly textured and that the ultimate furniture user will not be unduly aware of the depth of the texture. For instance, such a textured laminate will provide a suitable writing surface if used as a desk top.

Because of this unique dimension in texture, i.e., one which is coarse enough to hide telegraphing, yet smooth enough to be accepted as planar, this "mini texture" has enjoyed great popularity and now accounts for over 50% of all the commercial laminates produced in the U.S.

The amount of aluminum foil used in laminate production is very substantial so that the aggregate value of such foil consumed annually is very great. Laminate manufacturers have, therefore, sought materials which would be lower in cost on a unit basis, since the annual savings to be realized are of an important magnitude. One manner in which this may be accomplished is to replace the aluminum caul stock with a sheet of paper which is coated with a material which will fill surface voids and impart a texture of sufficient smoothness and gloss to the surface of a decorative laminate. Textured laminates may have useful gloss levels ranging from about 6 units to about 25-30 units.

It is necessary for the texturing sheet to release readily after it has been used on the laminate, hence a release agent of some type is often applied in a very thin layer over the basic texturing coat. In U.S. Pat. No. 3,946,135 to Peterson, such a release paper is described. Said release paper comprises a first coat constituting a clay-adhesive base coat and a second coat of a thermosetting resin.

Release agents which are applied as a distinctly second coat are called "external release agents" since they never enter the central volume of the texturing coat. (See "Selecting Mold Release Agents for FRP" J. W. Waldeck, *Plastics World*, pps. 40–42, Jan. 19, 1976.)

SUMMARY

A novel texturing sheet which can be used in the production of laminates via heat and pressure consolidation of resin impregnated paper sheets is disclosed herein. The texture-release sheet provides the type of decorative laminate surface required of commercial users at a lower cost than aluminum foil release sheets.

DESCRIPTION OF THE INVENTION INCLUDING PREFERRED EMBODIMENTS

The novel texture-release sheet of the present invention comprises (1) a cellulosic paper sheet coated with a first coating comprising
(A) an oil-modified alkyd resin which is cross-linked with from about 30 to about 70%, by weight, based on the total weight of the alkyd of a polyalkylether of a polymethylol melamine and a second coating atop said (A), comprising
(B) a copolymer containing from about 15 to about 85 mole percent of recurring units having the formula

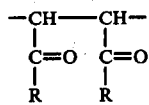

wherein each R is, individually, $OR^1$, $R^1$ being hydrogen or $C_1$–$C_{22}$ alkyl, or the two R groups taken together form an oxa group and the remaining units are recurring units of the formula

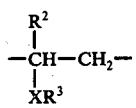

wherein $R_2$ is hydrogen or methyl, $R^3$ is a $C_9$–$C_{30}$ alkyl radical and X is O or $CH_2$.

The substrates utilized to form the novel release sheets hereof comprise any cellulosic sheet such as bleach sulfate, kraft, clay coated kraft, parchment, clay coated parchment, greaseproof paper, glassine paper, clay coated publication paper and the like. Greaseproof paper is well known to those skilled in the art as is glassine paper, a complete description of each being set forth in the Second Edition, Volume III, of Papermaking and Paperboard Making, McGraw-Hill Book Company, 1969, page 182, Pulp and Paper Manufacture, Ronald G. MacDonald, Editor. Two useful materials are SC Dark Amber glassine and Lard-Pak, manufactured by St. Regis Paper Company, Rhinelander, Wis., see also U.S. Pat. No. 3,770,687.

The oil-modified alkyd resins useful herein are well known in the art and are generally disclosed in U.S. Pat. Nos. 2,579,980; 2,600,623; 2,618,617; 2,648,642; 2,649,423, which patents are hereby incorporated herein by reference.

In the preparation of these oil-modified alkyd resins useful herein, the amount of oil present as a modifier should range from about 5 to about 50%, by weight, based on the total weight of the modified alkyd resin. The alkyd resins may be prepared from saturated or unsaturated polycarboxylic acids, however, the saturated acids are preferred. Suitable acids include phthalic, isophthalic, terephthalic, succinic, oxalic, malonic, succinic, glutaric, sebacic, adipic, pimelic, suberic, azelaic, citric, tricarballylic, tartaric, malic, maleic, fumaric, itaconic and the like.

Suitable polyhydric alcohols include ethylene glycol, propylene glycol, diethylene glycol, dipropylene glycol, trimethylene glycol, pinacol, trimethylol propane, neopentyl glycol, arabinol, sorbitol, glycerol, pentaerythritol and the like.

Suitable reaction conditions already known in the art may be employed, a slight excess of the alcohol being used to insure complete reaction. Among the oils which may be used to modify the alkyd resin are tung oil, tall oil, perilla oil, linseed oil, hemp seed oil, caster oil, cottonseed oil, corn oil, olive oil, peanut oil, cod liver oil, candlenut oil and the like.

The oil-modified alkyd resin used to form the first coating of the release sheets of the instant invention are cross-linked with a suitable polyalkylether of a polymethylol melamine. Examples of these melamine materials encompass the dimethyl, diethyl, dipropyl, dibutyl etc. ethers; the trimethyl, triethyl, tripropyl, tributyl ethers; the tetramethyl, tetraethyl, tetrapropyl, tetrabutyl etc., ethers; the pentamethyl, pentaethyl, pentapropyl, pentabutyl etc., ethers; and the hexamethyl, hexaethyl, hexapropyl, hexabutyl etc., ethers of the dimethylol, trimethylol, tetramethylol, pentamethylol or hexamethylol melamines. Of course, mixed polyalkyl ethers such as the dimethyl, tetraethyl ethers etc. of the polymethylol melamines may also be used. The preferred melamine material is hexakismethoxymethyl melamine. These materials may be produced as set forth in U.S. Pat. Nos. 2,906,724; 2,918,452; 2,998,410; 2,998,411; 3,107,222; 3,422,076, etc., which patents are hereby incorporated herein by reference. A suitable mol ratio of melamine to aldehyde, preferably paraldehyde is 1:3 to 1:6, respectively, and the alcohol used to impart the alkyl ether portion to the melamine material is preferably a $C_1$–$C_4$ alcohol. The amount of melamine material used to cross-link the oil-modified alkyd resin should range from about 30 to about 70% of the melamine material, based on the total weight of the oil-modified alkyd and the melamine material.

The vinyl ether or unsaturated alkyl copolymer which is used to form the second coating of the novel release sheets of this invention is also known to those skilled in the art and is generally set forth in U.S. Pat. No. 3,770,687, hereby incorporated herein by reference, and its formation may be had via the method set forth therein and according to U.S. Pat. No. 2,047,398.

The vinyl ether or unsaturated alkyl copolymer can be prepared by copolymerizing about 15 to 85 mol percent of the vinyl ether or unsaturated alkyl monomer with, correspondingly, about 85 to 15 mol percent of the maleic acid, ester or anhydride under conditions to produce copolymers having a relative viscosity of at least about 0.1. The preferred comonomers are maleic anhydride and a $C_{18}$ alkyl vinyl ether or octadecene-1.

The compositions used to prepare the novel release sheets are generally prepared as solutions of from about 0.5 to about 80.0%, by weight, based on the total weight of the composition, thereof in an organic solvent. The solvents useful include aromatic hydrocarbons such as benzene, toluene, xylene, etc.; aliphatic hydrocarbons such as hexane, heptane, etc.; dimethylformamide; butyrolactone; tetrahydrofuran; isopropanol; dimethylsulfoxide; dioxane, mixtures thereof and the like.

The compositions may be prepared by individually dissolving the oil-modified alkyd, the polyalkylether of the polymethylol melamine and the copolymer individually in their own different solvents and then blending the alkyd and melamine solutions together before forming the coating thereof and that of the copolymer, or the components may be formed as individual solutions in the same solvent in the proper concentrations and then blended and coated as indicated above.

The two coatings may each be applied to the paper substrate by any convenient means such as by reverse roll, air knife, gravure cylinder and the like. The total thickness of the two coatings combined should range from about 0.1 to about 0.3 mil (1.5–5.0 lbs./3000 ft.$^2$ ream dry) with the thickness of the first (cross-linked alkyd) coating comprising at least about 75% thereof.

It is preferred that an acid catalyst be added to the first coating composition before application of it to the substrate in order to assure that the melamine compound fully cross-links the oil-modified alkyd. From about 1.0 to about 10.0%, by weight, based on the total weight of the oil-modified alkyd and the melamine material, should be used with p-toluene sulfonic acid being preferred. Xylene sulfonic acid, O- and m-toluene sulfonic acids, ethyl acid phosphate, n-butyl phosphoric acid, phosphoric acid, hydrochloric acid and the like can also be used.

If desired, conventional thickening agents, leveling agents, etc., may be added to either or both of the coating compositions in order to adjust their viscosities to the requirements of the coating equipment and to regulate pick-up, etc.

The coated paper substrate is subjected to curing which involves subjecting the release sheet to heat to cross-link the alkyd with the melamine compound. A temperature ranging from about 200° F. to about 450° F. can be used, cross-linking generally being complete in from 5 minutes to 15 seconds, correspondingly. The cross-linking may be effected before or after application of the second coating.

The texture-release sheets of this invention, as mentioned above, are exceptionally useful in the production of decorative laminates in that they are capable of withstanding the heat and pressure required to produce decorative laminates without deterioration and release completely and rapidly from the resin-impregnated surfaces of the laminates after they are removed from the laminating press. They may be used in the production of the so-called "high pressure" laminates wherein a series of 3–12 phenol/formaldehyde resin impregnated kraft sheets are utilized as a core medium upon which are superimposed a melamine resin impregnated decorative sheet containing a specific solid color or a decorative surface of some specific design, i.e., simulated wood grain, and an overlay sheet which is also melamine resin impregnated, or so-called "low-pressure" laminates or panels which comprise a self-supporting substrate such as particleboard, plywood, etc., upon which is heat and pressure consolidated a melamine resin impregnated decorative sheet, as described above. The amount of heat applied in the production of each type of product is about the same, i.e., from about 100°–250° F., however, the high-pressure laminates are produced at a pressure of over 900 psi and usually 1100–1500 psi while the low-pressure panels are produced below 900 psi, usually 250–750 psi.

The following examples are set forth for purposes of illustration only and are not to be construed as limitations on the present invention except as set forth in the appended claims. All parts and percentages are by weight unless otherwise specified.

EXAMPLES 1–5

To 92.5 parts of a commercially available alkyd resin solution produced from 39.7 parts of soya oil, 41.3 parts of isophthalic acid and 19.0 parts of glycerol and having a solids content of about 62%, a viscosity of 23–29 secs. #2 Zohn cup. 77.0° F. and a density of 8.4–8.7 lbs./gallon, in a 67/33 isopropanol/xylene solvent, and containing 50% of hexakismethoxymethyl melamine, are added 7.5 parts of a catalyst solution comprising 50% p-toluene sulfonic acid and 50% isopropanol. By means of a gravure printing cylinder having a quad cell pattern of a diagonal count of 120 per inch and a cell depth of 0.0032 inch uniformly knurled over its entire face, the alkyd-catalyst solution is applied to a 35 lb./3000 ft.$^2$ ream bleached kraft grease-proof paper at 0.1 mil thickness. The coated paper is then dried and cross-linked in a high velocity hot air oven for 30 sec. at 280° F. The coating weight, after cross-linking, is 1.8 lbs./3000 ft.$^2$ ream.

To the resultant coated sheet are then applied various amounts of a methylisobutylketone solution of an equimolar copolymer of maleic anhydride and octadecene-1, i.e., in Formula I, above, the two R groups form an oxa group and in Formula II, above, $R^2$ is hydrogen, X is $CH_2$ and $R^3$ is a $C_{15}$ alkyl group. The second coating is applied by means of a 150 Q quad rotogravure cylinder on a Geiger laboratory printing press. The cylinder applies 0.5–0.6 parts of wet coating to the substrate. The resultant doubly coated paper is then dried at 125° C. for 10 minutes to remove the ketone solvent.

The coated paper is then cut into 4 × 8 foot sheets and placed in a press pack assembly as follows top to bottom:
A. A stainless steel press plate with its polished surface facing downward.
B. A sheet of the doubly coated paper with its coated surface downward.
C. A conventional overlay sheet comprising a 28 lb./3000 ft.$^2$ ream, α-cellulose paper having impregnated therein about 64 weight percent of a commercial melamine/formaldehyde laminating resin. The volatile content is about 5%.
D. A conventional pigmented decorative paper bearing a wood grain print, facing upward and having impregnated therein about 40 weight percent of a commercial laminating resin similar to that in the overlay. The volatile content is about 5%.
E. Five plies of a 115 lb./3000 ft.$^2$ ream kraft saturating paper having impregnated therein 25 weight percent of a conventional phenol/formaldehyde laminating resin. The volatile content is again 5%.
F. A layer of glassine paper as a separator sheet.

The entire assembly is then repeated in inverted order to produce a so-called "back-to-back" press assembly, whereupon it is fitted with conventional layers of cushion paper on the outside surfaces of the stainless steel press plates. The entire assembly is then sandwiched between appropriate cold rolled steel plates and placed into a conventional high pressure laminating press. A pressure of 1400 psi is applied to the assembly. It is heated to 142° C. in about 25 minutes and held at that temperature for 12 minutes. The entire assembly is then cooled to room temperature and withdrawn from the press and the laminates are recovered.

It is found that the doubly coated paper releases readily from the laminate, leaving no particles of paper, resin or other debris. In order to measure the ease with which such paper is stripped from the laminate, the following test is performed.

Using a sharp knife, a slit is made from the upper (uncoated) surface of the release sheet as it yet remains on the pressed laminate and before any effort has been made to disengage it from the laminate. The slit is cut along a straight line using a metal rule as guide for a distance of 10 inches. From one end of this slit, a second slit is cut for 10 inches in a direction perpendicular to the first slit. At the point of intersection of these slits, a small flap is raised by the insertion of the knife edge and the paper is peeled from the laminate along a line bisecting the angle between the two slits; that is, along a line at 45° to the original slits. When about 1.5 inches has been so lifted, a spring type paper clip is attached to the paper flap and the clip allowed to close so that it holds the paper firmly. A spring balance capable of reading up to 60 grams is attached to the paper clip and the stripping of the paper continued along the direction of the bisector. As the paper is stripped back, the line along which peeling occurs is approximately perpendicular to the bisector and increases in length as peeling is continued. At the point where the paper-laminate contact line is 5 inches in length, the force required to continue peeling is noted on the balance as the Cling Strength in grams/5 in. The results are set forth in Table I, below.

TABLE I

| EX. | CONC. OF COPOLYMER IN KETONE SOLVENT | CLING STRENGTH GMS/5 IN. |
| --- | --- | --- |
| 1 | 2.0% | 23 |
| 2 | 1.0% | 36 |
| 3 | 0.5% | 34 |
| 4 | 0.2% | 37 |
| 5 | 0.1% | 40 |

CLING STRENGTHS

At a cling strength of 60 grams/5 in., it is found that the release paper can be stripped from the laminate without the picking of paper fiber or other residues. At much above this level, however, it is difficult to remove the entire sheet of release paper from the laminate surface. Commercial laminates are produced in volume in 5 × 12 foot sizes. It is desirable that the person who is removing the release sheet for discard be able to do it with ease, usually with a gentle, sweeping pull from one end of the sheet. If the paper does not release easily from every part of the laminate, it is necessary to pull several times or even to walk around the sheet to loosen the more clinging areas. This takes time which means that either the conveyor line carrying the laminates to be stripped must be slowed or additional manpower must be used. Either solution increases the cost of operation. Thus, a maximum useful cling strength is below about 60 grams/5 in., with preferred values being in the range of 15–40 grams/5 in.

EXAMPLE 6

Following the procedure of Example 1 except that the second coating is applied as a 40 % toluene solution of an equimolar alkyl vinyl ether/maleic anhydride copolymer in which the alkyl vinyl ether is a mixture of 96% $C_{18}$ alkyl, 2% $C_{16}$ alkyl and 2% $C_{10}$–$C_{14}$ alkyl vinyl ethers. The Cling Strength value is similar to that of Example 1.

EXAMPLE 7

Release sheets are prepared as in Example 1 sufficiently large to cover 4 × 10 foot press plates. The release sheets are inserted between the polished press plates and the surfacing prepregs of a low pressure panel (particule-board substrate) with the coated face of the release sheet adjacent to the prepreg. Release sheets are used on the top and bottom plates.

When the press is opened and the board is ejected hot after lamination, the release sheet remains with the board and is cleanly released from the polished plates. While still hot, the release sheet is easily removed from the decorative board. An excellent decorative board is recovered.

EXAMPLE 8

100 Parts of the maleic anhydride/alkyl vinyl ether copolymer of Example 7 are refluxed with 50 parts of 1.0N sulfuric acid at 110° C. for 7 hours to hydrolyze the anhydride to the acid, i.e., $R^1$ in Formula I, above, is hydrogen. A white, soft, waxy solid separates from the media, is recovered by decantation, washed in cold water until free of sulfuric acid and dissolved in a 50:50 mixture of isopropanol and toluene to form a solution containing 40% solids. This solution is used in the same manner as the maleic anhydride copolymer of Example 8. The resultant texture release sheet is easily removed from the laminate. The hydrolyzed copolymer solution is found by infra-red spectroscopy to be 90–100% in the form of the acid.

EXAMPLES 9–11

The coatings of Example 1 are applied to a series of different cellulosic sheets as described in said example. In each instance, the results are comparable to those of Example 1. Example 9 employs a sheet of kraft paper; Example 10, a sheet of publication stock, clay coated on one side and Example 11, a sheet of publication stock coated on both sides. Publication stock is a high quality paper material usually employed in the printing of high quality magazines.

EXAMPLES 12–20

The procedure of Example 1 is again followed except that the alkyd resin used as the first coating is varied as is the copolymer used as the second coating. The copolymer is set forth with reference to Formulae I and II, above. In each instance, results substantially equivalent to those shown in Example 1 are observed. The materials are shown in Table II, below.

TABLE II

| EX. | ALKYD RESIN | | COPOLYMER R | R¹ | R² | X | R³ |
|---|---|---|---|---|---|---|---|
| 12 | Soya fatty acids | - 40% | OR¹ | both C₄ alkyl | H | O | C₁₀ alkyl |
|  | Benzoic acid | - 2% |  |  |  |  |  |
|  | Isophthalic acid | - 38% |  |  |  |  |  |
|  | Glycerol | - 20% |  |  |  |  |  |
| 13* | Coconut oil | - 31% | OR¹ | both C₁₈ alkyl | H | O | C₁₈ alkyl |
|  | Isophthalic acid | - 40% |  |  |  |  |  |
|  | Trimethylol ethane | - 29% |  |  |  |  |  |
| 14 | Soya fatty acids | - 53% | OR¹ | hydrogen C₁₂ alkyl | H | CH₂ | mixture of C₁₅ alkyl C₁₉ alkyl and C₂₇ alkyl |
|  | Phthalic anhydride | - 27.8% |  |  |  |  |  |
|  | 98% glycerine | - 19.2% |  |  |  |  |  |
| 15 | Soya oil | - 45.5% |  |  |  |  |  |
|  | Dehydrogenated Castor oil | - 15.0% | OR¹ | hydrogen & C₁₃-C₁₆ alkyl mixture | H | O | C₉ alkyl |
|  | Phthalic anhydride | - 23.5% |  |  |  |  |  |
|  | Pentaerythritol | - 16.0% |  |  |  |  |  |
| 16 | Soya oil | 45.1% |  |  |  |  |  |
|  | Isophthalic anhydride | 38.3% | oxa | — | CH₃ | O | C₁₂ alkyl |
|  | Pentaerythritol | 5.6% |  |  |  |  |  |
|  | Ethylene glycol | 11.0% |  |  |  |  |  |
| 17** | Tall oil fatty acids | 40.4% |  |  |  |  |  |
|  | Adipic acid | 10.5% | oxa | — | H | CH₂ | C₁₅ alkyl |
|  | Trimellitic anhydride | 41.5% |  |  |  |  |  |
|  | Propylene glycol | 38.3% |  |  |  |  |  |
| 18 | Tall oil fatty acids | 44.7% |  |  |  |  |  |
|  | Phthalic anhydride | 32.6% | oxa | — | H | CH₂ | C₉ alkyl |
|  | Pentaerythritol | 15.9% |  |  |  |  |  |
|  | Ethylene glycol | 6.8% |  |  |  |  |  |
| 19 | Soya oil | 57.0% |  |  |  |  |  |
|  | Tung oil | 14.2% | oxa | — | H | CH₂ | C₁₃ alkyl |
|  | Phthalic anhydride | 19.5% |  |  |  |  |  |
|  | glycerol | 9.3% |  |  |  |  |  |
| 20 | Tall oil fatty acids | 27.0% |  |  |  |  |  |
|  | Phthalic anhydride | 39.0% | oxa | — | H | O | C₁₅ alkyl |
|  | Trimethylol Propane | 35.0% |  |  |  |  |  |

*mixed melamine - MF₅.₀Me₃.₇ (average methylolation and methylation) used to cross-link alkyl resin
**hexabutylated hexamethyl melamine used to cross-link alkyd resin

We claim:

1. A release sheet for use in the production of laminates comprising
   (1) a cellulosic paper sheet coated with a first coating comprising
      (A) an oil-modified alkyd resin cross-linked with from about 30 to about 70%, by weight, based on the total weight of (A), of a polyalkylether of a polymethylol melamine and a second coating, atop said (A), comprising
      (B) a copolymer containing from about 15 to about 85 mole percent of recurring units having the formula

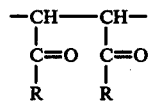

wherein each R is, individually, OR¹, R¹ being hydrogen or C₁-C₂₂ alkyl, or the two R groups taken together form an oxa group, and the remaining units are recurring units of the formula

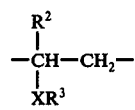

wherein R² is hydrogen or methyl, R³ is a C₉-C₃₀ alkyl radical and X is O or CH₂.

2. A release sheet according to claim 1 wherein said (1) is grease-proof paper.
3. A release sheet according to claim 1 wherein said (1) is glassine paper.
4. A release sheet according to claim 1 wherein said recurring units of component (B) are derived from maleic anhydride and a C₁₈ alkyl vinyl ether.
5. A release sheet according to claim 1 wherein said (1) is clay coated paper.
6. A release sheet according to claim 1 wherein the two R groups are taken together and form an oxa group.
7. A release sheet according to claim 1 wherein both R groups are hydrogen.
8. A release sheet according to claim 1 wherein R² is hydrogen, X is CH₂ and R³ is a C₁₅ alkyl group.
9. A release sheet according to claim 1 wherein the two R groups are taken together and form an oxa group, R² is hydrogen, X is CH₂ and R³ is a C₁₅ alkyl group.
10. A release sheet according to claim 1 wherein the polyalkylether of a polymethylol melamine is hexakismethoxymethyl melamine.
11. A release sheet according to claim 1 wherein the alkyd resin is derived from soya oil, isophthalic acid and glycerol.
12. A release sheet according to claim 1 wherein the alkyd resin is derived from soya oil, isophthalic acid and glycerol and the copolymer is derived from maleic anhydride and a C₁₈ alkyl vinyl ether.
13. A release sheet according to claim 1 wherein the alkyd resin is derived from soya oil, isophthalic acid and glycerol and the copolymer is derived from maleic anhydride and octadecene-1.

* * * * *